Sept. 6, 1960 W. J. WRIDE 2,951,880
SOLVENT RECOVERY
Filed Dec. 23, 1957
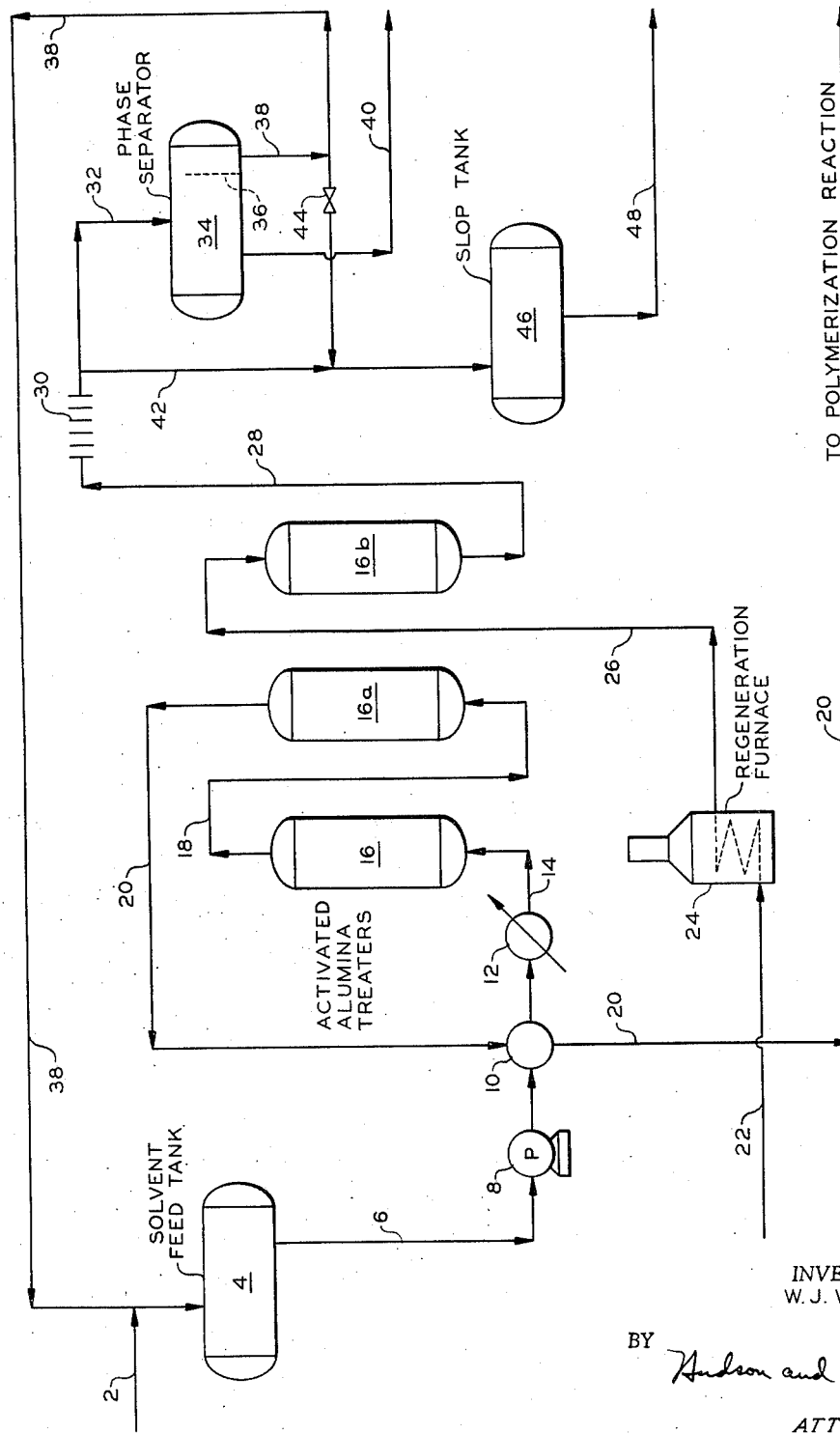
INVENTOR.
W. J. WRIDE
BY Hudson and Young
ATTORNEYS United States Patent Office 2,951,880
Patented Sept. 6, 1960

2,951,880
SOLVENT RECOVERY

William J. Wride, Bartlesville, Okla., assignor to Phillips Petroleum Company, a corporation of Delaware Filed Dec. 23, 1957, Ser. No. 704,672
8 Claims. (Cl. 260—666)

This invention relates to the purification of hydrocarbons. In one aspect it relates to the recovery of a hydrocarbon from an adsorbent material containing said hydrocarbon and impurities. In another aspect it relates to the recovery of solvent material from an adsorbent material with which said solvent has been contacted for the purpose of removing impurities which adversely affect the polymerization of olefins to solid polymers.

When carrying out many chemical processes it is frequently desirable to utilize hydrocarbons as diluents, solvents, adsorbents, etc. Usually it is preferred that the hydrocarbons be treated before use to remove any extraneous materials which might have a deleterious effect in the process, for example to eliminate contamination of the various products, catalyst poisons, etc. For example, the polymerization of olefins to solid polymers thereof is facilitated by the use of various hydrocarbon materials which act as solvents for the polymerization reaction product, as diluents in the polymerization reaction and as aids in controlling the reaction temperature. Usually, the solvents or diluents employed are obtained from hydrocarbon mixtures such as fractions of petroleum and contain various impurities which have an adverse effect on the polymerization reaction and reduce the rate of polymerization. In one method, as set forth in the copending application of R. F. Dye, Serial No. 683,463, filed September 12, 1957, impurities present in the solvent are removed by contacting the solvent with activated alumina or bauxite. After extended use the adsorbent becomes ineffective, and it is necessary to regenerate this material by removing the adsorbed impurities. In addition to retaining impurities the spent adsorbent also adsorbs a substantial quantity of the solvent material and it is desirable to recover as much as possible of this material for reuse in the polymerization process.

It is an object of this invention to provide an improved process for the purification of hydrocarbons.

Another object of the invention is to provide an improved process for the recovery of hydrocarbons from an adsorbent.

Still another object of the invention is to provide an improved process for treating hydrocarbon materials utilized as diluents in the polymerization of olefins to solid polymers.

These and other objects of the invention will become more readily apparent from the following detailed description and discussion.

The foregoing objects are achieved broadly by stripping from an adsorbent, containing a hydrocarbon and impurities, a fraction low in impurities and contacting said fraction with adsorbent to remove impurities.

In one aspect of the invention spent adsorbent, containing a hydrocarbon material used as a diluent in the polymerization of olefins to solid polymers and impurities associated with said hydrocarbon material, is contacted with heated stripping gas, material stripped from the adsorbent is segregated to obtain a fraction low in impurities, said fratcion is contacted with adsorbent to remove impurities and said fraction is employed thereafter in the polymerization reaction.

The following discussion is directed particularly to the treatment of adsorbed hydrocarbons utilized in the polymerization of olefins to solid polymers. This is not intended however in any limiting sense and it is within the scope of the invention to treat adsorbed hydrocarbons in general as hereinbefore set forth.

The polymers which are produced within the scope of this invention include a wide variety of olefin polymers, such as, for example, polymers or copolymers of monoolefins like ethylene, propylene, butylene, etc., also copolymers of mono-olefins and diolefins such as butadiene, isoprene, etc. The invention is particularly applicable to the polymerization of 1-olefins having a maximum of 8 carbon atoms per molecule and no branching nearer the double bond than the 4-position and more particularly to the production of polymers of ethylene which have a specific gravity of at least 0.94 at 20° C. and preferably 0.96 or higher and a crystallinity of at least 70 percent and preferably at least 80 percent at ordinary atmospheric temperatures.

A preferred polymerization method is described in detail in a copending application of Hogan and Banks, Serial No. 573,877, filed March 26, 1956, now Patent No. 2,825,721. This particular method utilizes a chromium oxide catalyst, preferably containing hexavalent chromium with silica, alumina, silica-alumina, zirconia, thoria, etc. In one embodiment of this application, olefins are polymerized in the presence of a hydrocarbon diluent, for example, an acyclic, alicyclic or, less preferably, aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous procedures which employ different catalyst are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The temperature required for polymerizing olefins varies over a wide range, however, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is, at least about 100 to 300 p.s.i.g., depending upon the type of feed material and the polymerization temperature.

Higher pressures up to 500 to 700 p.s.i.g. or higher can be used, if desired. If it is desired to carry out the process in the vapor state, much lower pressure, down to atmospheric, can be employed. When utilizing a fixed bed the space velocity varies from as low as about 0.1 to about 20 volumes of feed per volume of catalyst, with the preferred range being between about 1 and about 6 volumes per volume per hour. When operating with a mobile catalyst it is desirable to maintain the catalyst concentration in the reaction zone between about 0.01 and about 10 percent by weight. Residence time can be from 10 minutes or less to 10 hours or more.

The use of a diluent in the polymerization reaction, in general, serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually, the olefin constitutes between about 0.1 and about 25 percent by volume of the mixture and preferably between about 2 and about 15 percent by volume.

The solvent or diluent employed in the polymerization reaction includes in general, paraffin type hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also particularly useful in the polymerization reaction are alicyclic hydrocarbons, having 5 to 12 carbon atoms, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, nondeleterious, and in the liquid state at the reaction conditions can also be employed in carrying out the reaction of olefins to form solid polymers.

In carrying out the invention an adsorbent, such as activated alumina spent in the removal of impurities from a polymerization hydrocarbon solvent or diluent, such as cyclohexane, is contacted with a heated stripping gas whereby adsorbed solvent and impurities are stripped from the adsorbent. The desorbed material is separated into fractions such that a portion of this material is obtained which contains a low proportion of impurities. This fraction is then treated for the removal of impurities by contact with bauxite or activated alumina and introduced to a polymerization zone wherein polymerization of an olefin to solid polymer is effected in the presence of a polymerization catalyst. As previously mentioned the treated hydrocarbon is utilized in the polymerization reaction as a solvent for the polymer product, and also as a diluent to aid in control of the polymerization reaction temperature. The various catalysts employed in the polymerization reaction, the olefins to be polymerized, and the polymerization reaction conditions are selected from those set forth in the preceding discussion.

The impurities which are present in the desorbed solvent have an adverse effect on the polymerization reaction and must be removed before the solvent is introduced to the reaction zone. The impurities include various types of compounds such as water, oxygen, in the form of alcohols or ethers, carbonyl compounds, such as acetone, sulfur, in the form of organic sulfides and mercaptans, and organic chlorides.

The adsorbents which are used in the method of this invention are bauxite and activated alumina. Activated alumina, which is preferred, is usually prepared by calcining aluminum trihydrate or a material such as bauxite containing aluminum trihydrate at a temperature between about 500 and about 1800° F. Bauxite, which is naturally occurring, can be utilized as an adsorbent after suitable activation, such as by heating at about 600° F.

Various stripping mediums can be used for the purpose of desorbing solvent from the activated alumina or bauxite, for example, inert gases, such as steam, nitrogen, carbon monoxide, carbon dioxide, methane, ethane, ethylene, propane, etc. Also, if desired, heated solvent or diluent vapors can be employed for this purpose.

The temperatures employed during the stripping and desorbing operation can vary over a wide range depending on the particular adsorbent used, the solvent material which is being removed therefrom, and the amount of solvent and impurities adsorbed. Usually, it is necessary to employ higher temperatures as the stripping operation proceeds and the amount of solvent retained by the adsorbent decreases. Effective stripping and desorption to provide removal of adsorbate can be obtained at initial temperature of between about 250 and about 300° F., with the temperature increasing during stripping to a maximum of between about 450 and about 550° F. The amount of stripping gas required can vary between about 0.05 and about 0.3 pound per hour per pound of adsorbent and preferably between about 0.1 and about 0.2 pound per hour per pound.

The term "spent adsorbent" as used herein includes adsorbent which contains a sufficient quantity of impurities such that it is no longer effective to remove impurities from the solvent material brought in contact therewith. Usually, it is found desirable to regenerate the adsorbent after this material has been used in the purification of between about 250 and about 1000 times its weight of solvent or diluent material. At this point the spent adsorbent usually contains between about 100 p.p.m. and about 1000 p.p.m. of impurities and about 0.1 and about 1.0 pound of solvent or diluent per pound of adsorbent. The portion of solvent which can be desorbed for use in the polymerization reaction is limited by the quantity of impurities in this material. It has been found desirable to use that portion of the desorbed solvent which when utilized in the polymerization of ethylene provides a productivity of 200 pounds polymer/pound catalyst/hour or greater. The reuseable solvent comprises an intermediate portion of the desorbed material, preferably the fraction lying between about 8 percent and about 98 percent of the adsorbate. Thus it is desirable to discard the initial and final portions of the adsorbate, both of which are concentrated in impurities.

The desorbed solvent, which is to be used in the polymerization reaction, is treated by contacting with activated alumina or bauxite to remove the impurities contained therein. This treatment, which is set forth in detail in the copending application of R. F. Dye, is carried out usually in one or more beds at normal atmospheric temperatures employing a solvent space velocity of between about 1 and about 10 pounds per hour of solvent per pound of adsorbent. Following removal of the impurities the solvent is introduced to the polymerization reaction.

In order to more clearly describe the invention and provide a better understanding thereof, reference is had to the accompanying drawing which is a diagrammatic illustration of a treating system utilizing activated alumina adsorbent and a regeneration system for recovering adsorbed solvent. Referring to the drawing, a solvent material such as cyclohexane containing impurities is introduced through conduit 2 to feed solvent tank 4. From this tank solvent material is passed through conduit 6, pump 8 and exchangers 10 and 12 into activated alumina treater 16, wherein the solvent is contacted with activated alumina for the purpose of removing the impurities present therein. This operation is carried out as a batch process therefore it is desirable to provide several treaters so that one or more of the treaters can be in the process of regeneration, emptying, filling, etc., whereby a continuous supply of treated material is obtained. In this particular operation two additional treaters 16a and 16b are provided. Each of the three treaters are interconnected at the inlets and outlets (not shown) so that each of them can be used interchangeably, in series or in parallel, as desired. In this specific operation, treater 16 is in treating service, 16a is used as a guard chamber and 16b is in the process of regeneration.

Solvent leaving treater 16 passes through guard chamber 16a which serves the purpose of removing any impurities which are not removed in the first treater. The purified solvent is removed through conduit 20, passes in indirect heat exchange with feed solvent in exchanger 10 and is then introduced to the polymerization reaction zone (not shown).

Treater 16b which contains spent adsorbent is regenerated by passing therethrough superheated steam. The steam is provided through conduit 22, being heated in regeneration furnace 24, and introduced to the treater through the conduit 26. Preferably, this material is passed through the treater in the direction of flow opposite to that employed during the treatment of the solvent material. The bottoms from the treater, comprising a mixture of steam, desorbed solvent, and impurities, pass through conduit 28 and air-fin cooler 30, wherein the gases are condensed, and then through conduit 32 into phase separator 34. Within the separator the condensate accumulates into two phases; a water phase superposed by a hydrocarbon phase. The water phase is withdrawn from the separator through conduit 40 and the hydrocarbon phase overflows baffle 36 and is combined with the feed solvent through conduit 38. If desired, the latter stream can be divided and a portion introduced to slop tank 46 through conduit 44. During both the initial and the final stages of the desorption-regeneration the material leaving treater 16b contains excessive amounts of impurities. In order to separate and recover a suitable material for reuse in the polymerization reaction the fractions having high impurities content are bypassed around the phase separator and introduced to slop tank 46 through conduit 42. The material in the slop tank, which is not suitable for reuse, is removed from the unit through conduit 48.

The preceding discussion has been directed particularly to the recovery of cyclohexane, however, this is not to be taken in any limiting sense and it is within the scope of the invention to recover other solvent materials as hereinbefore set forth.

The following data are presented in illustration of a preferred embodiment of the invention.

*Example*

An alumina bed used for the pretreatment of cyclohexane employed in the polymerization of ethylene to solid polymers was regenerated under the following conditions:

Type of regeneration _____ Superheated steam.
Solvent passed through bed before
 regeneration _____ 660 lbs./lb. alumina.
Maximum steam temperature ___ 494° F.
Maximum bed temperature _____ 465° F.
Total adsorbate (cyclohexane) ___ 46,190 ml.

The adsorbate was collected in fourteen cuts and treated with activated alumina (0.79 lb. alumina/lb. solvent) following which various fractions were utilized in the polymerization of ethylene in the presence of a chromium oxide catalyst containing hexavalent chromium under the following reaction conditions and with the following results:

| Sample | #1 | #2 | #3 | #4 |
|---|---|---|---|---|
| Fraction, Vol. percent of total absorbate | 8.0-91.4 | 0-91.4 | 0-97.8 | 0-100 |
| Reaction rate, lb. polymer formed/lb. of catalyst per hour | 260 | 175 | 183 | 133 |
| Reaction Conditions: | | | | |
| Temperature, °F | 285 | 285 | 285 | 285 |
| Pressure, p.s.i.g. | 450 | 450 | 450 | 450 |
| Catalyst, gm | 0.28 | 0.27 | 0.32 | 0.28 |
| Cyclohexane, gm | 0.4 | 0.4 | 0.5 | 0.4 |
| Time, hours | 1.5 | 1.5 | 1.5 | 1.5 |

It is to be noted that sample #1, in which the adsorbate tested was an intermediate cut, gave by far the highest polymerization reaction rate.

Having thus described the invention by providing specific examples thereof it is to be understood that no undue restrictions or limitations are to be drawn by reason thereof and that many variations and modifications are within the scope of the invention.

I claim:

1. The process for recovering a hydrocarbon material from an adsorbent, selected from the group consisting of bauxite and activated alumina, containing said hydrocarbon material and impurities and having become spent by treatment of such hydrocarbon material to remove said impurities therefrom, which process comprises contacting said adsorbent with heated gas whereby said hydrocarbon material and impurities are stripped from the adsorbent, recovering a fraction of adsorbate which is low in impurities and contacting said fraction with adsorbent whereby impurities are removed from said hydrocarbon material.

2. A process according to claim 1 wherein said hydrocarbon material is selected from the group consisting of paraffins having from 3 to 12 carbon atoms per molecule and alicyclic paraffinic hydrocarbons having from 5 to 12 carbon atoms per molecule.

3. The process of claim 1 in which the fraction of adsorbate which is low in impurities is an intermediate fraction.

4. The process of claim 3 in which the said fraction of adsorbate comprises the fraction lying between about 8 and about 98 percent of the total desorbed diluent.

5. In a process in which cyclohexane is treated with an adsorbent material selected from the group consisting of bauxite and activated alumina to remove impurities, the improvement which comprises contacting said adsorbent after termination of the treating process with a heated gas whereby adsorbed cyclohexane and impurities are stripped therefrom, recovering a fraction of stripped adsorbate which is low in impurities and contacting said fraction with adsorbent whereby impurities are removed.

6. The process of claim 5 in which the fraction of adsorbate which is low in impurities is an intermediate fraction.

7. The process of claim 6 in which said fraction of adsorbate comprises the fraction lying between about 8 percent and about 98 percent of the total desorbed diluent.

8. In a process in which cyclohexane is treated with an adsorbent material selected from the group consisting of bauxite and activated alumina to remove impurities, the improvement which comprises contacting said adsorbent, after termination of the treating process, with a heated gas whereby adsorbed cyclohexane and impurities are stripped therefrom, recovering an intermediate fraction of the stripped adsorbate comprising the material lying between about 8 and about 98 percent of the total adsorbed diluent, and contacting said fraction with adsorbent whereby impurities are removed.

References Cited in the file of this patent

UNITED STATES PATENTS

| 2,495,286 | Brubaker | Jan. 24, 1950 |
| 2,600,106 | Garrett | June 10, 1952 |
| 2,731,452 | Field | Jan. 17, 1956 |